(12) United States Patent
Willis

(10) Patent No.: US 9,680,305 B2
(45) Date of Patent: Jun. 13, 2017

(54) IMPLEMENTATION OF FIRE SAFETY SHUTDOWN FOR SOLAR PANELS WITH HIGH RELIABILITY

(71) Applicant: HIQ SOLAR, INC., Santa Clara, CA (US)

(72) Inventor: Andre P. Willis, Palo Alto, CA (US)

(73) Assignee: HiQ Solar, Inc., Santa Clara, CA (US)

( * ) Notice: Subject to any disclaimer, the term of this patent is extended or adjusted under 35 U.S.C. 154(b) by 507 days.

(21) Appl. No.: 14/203,964

(22) Filed: Mar. 11, 2014

(65) Prior Publication Data

US 2014/0265586 A1  Sep. 18, 2014

Related U.S. Application Data

(60) Provisional application No. 61/781,544, filed on Mar. 14, 2013.

(51) Int. Cl.
*H02J 1/00* (2006.01)
*H02J 3/38* (2006.01)

(52) U.S. Cl.
CPC .............. *H02J 3/383* (2013.01); *H02J 1/00* (2013.01); *Y02E 10/563* (2013.01); *Y10T 307/549* (2015.04); *Y10T 307/691* (2015.04); *Y10T 307/747* (2015.04); *Y10T 307/832* (2015.04)

(58) Field of Classification Search
CPC ...... G05F 1/66; G05F 1/67; H02J 1/00; H02J 1/10; H02J 1/14; H02J 1/102; H02J 3/38; H02J 3/381–3/383; H02J 3/385; Y02E 10/50; Y02E 10/56; Y02E 10/563; Y10T 307/50; Y10T 307/549; Y10T 307/555; Y10T 307/56; Y10T 307/685; Y10T 307/691; Y10T 307/74; Y10T 307/747; Y10T 307/76; Y10T 307/826; Y10T 307/832; Y10T 307/878; Y10T 307/885; Y10T 307/964
USPC ........ 307/43, 54, 63, 77, 78, 112, 113, 115, 307/125, 126, 132 E, 132 EA, 141.8; 330/116, 120, 121
See application file for complete search history.

(56) References Cited

U.S. PATENT DOCUMENTS

| | | | | |
|---|---|---|---|---|
| 5,821,729 A | * | 10/1998 | Schmidt | H02J 7/0018 307/72 |
| 8,624,436 B2 | | 1/2014 | Willis | |
| 9,143,056 B2 | * | 9/2015 | Ilic | H02M 7/5387 |
| 9,209,707 B2 | * | 12/2015 | Park | H02J 3/385 |
| 9,263,887 B2 | * | 2/2016 | Tiefenbach | B60L 11/1866 |

(Continued)

*Primary Examiner* — Levi Gannon
(74) *Attorney, Agent, or Firm* — Fountainhead Law Group P.C.

(57) ABSTRACT

System and method for restricting output power from multiple serially coupled DC power sources, such as a solar cell array, controlled by power balancing circuitry, thereby enabling power restriction in the event of an emergency. Output bypass circuitry allows the output voltage to be selectively restricted, and though power for switching between states would be needed, use of bi-stable bypass circuitry would avoid a need for power to remain in a state of bypass operation. Additionally, with the serially coupled DC power sources controlled by power balancing circuitry, use of solid-state current switching elements ensures continued output power restriction due to the clamping action of the body diodes upon the output voltage.

20 Claims, 3 Drawing Sheets

(56) References Cited

U.S. PATENT DOCUMENTS

| | | | | |
|---|---|---|---|---|
| 2010/0308660 A1* | 12/2010 | Willis | ................... | G05F 1/67 |
| | | | | 307/77 |
| 2012/0007433 A1* | 1/2012 | Wei | ................... | H02M 1/10 |
| | | | | 307/82 |
| 2012/0261996 A1* | 10/2012 | Beck | ................ | H01L 31/02021 |
| | | | | 307/77 |
| 2013/0038130 A1* | 2/2013 | Lai | ................... | H02M 7/487 |
| | | | | 307/80 |
| 2013/0058140 A1* | 3/2013 | Victor | ............ | H01L 31/02021 |
| | | | | 363/56.01 |
| 2013/0200710 A1* | 8/2013 | Robbins | ........... | H01L 31/02021 |
| | | | | 307/77 |
| 2014/0210272 A1* | 7/2014 | De Cock | ............. | H02J 7/0021 |
| | | | | 307/77 |

* cited by examiner

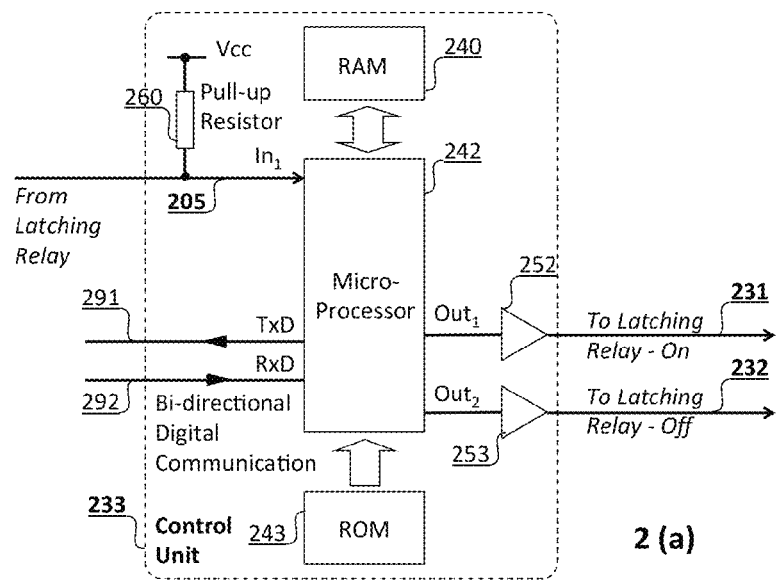
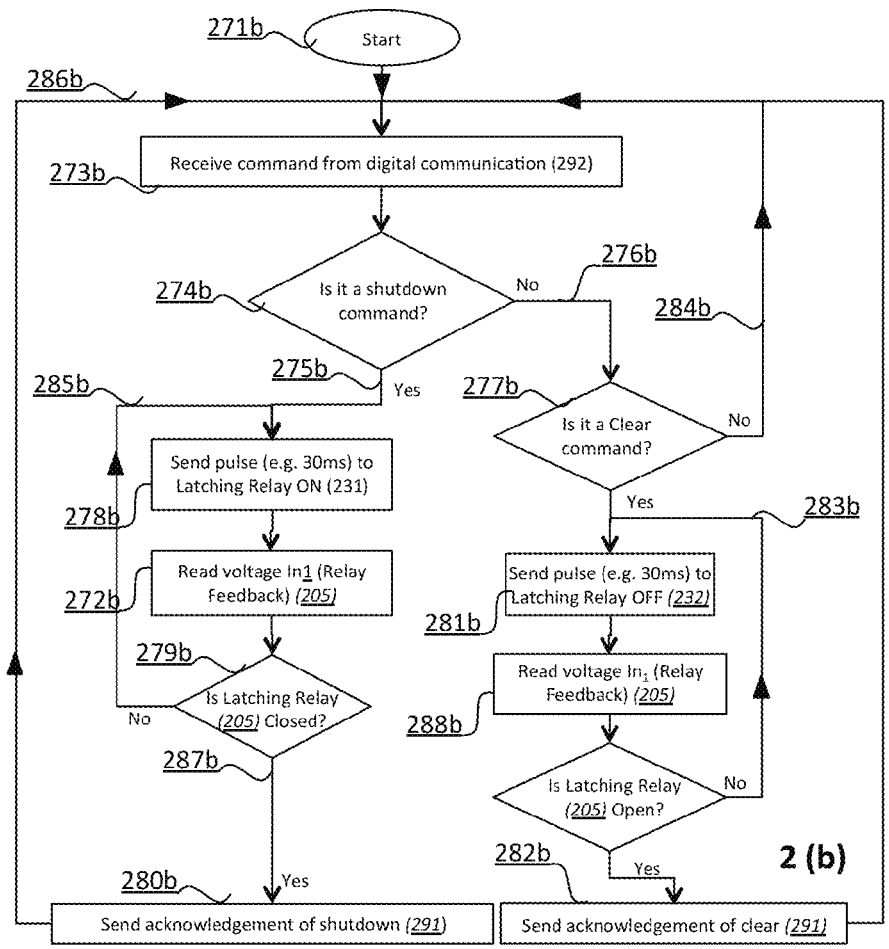
Figure 2 (a) and (b)

IMPLEMENTATION OF FIRE SAFETY SHUTDOWN FOR SOLAR PANELS WITH HIGH RELIABILITY

RELATED APPLICATIONS

This application claims priority to and the benefit of U.S. Patent Application 61/781,544, entitled "Novel Implementation of Fire Safety Shutdown for Solar Panels with High Reliability," which was filed on Mar. 14, 2013, the disclosure of which is incorporated herein by reference.

BACKGROUND

The present invention relates to solar panel shutdown techniques, and in particular, to solar panel shutdown techniques providing extra reliability to reduce fire hazards.

One issue with rooftop photovoltaic power generation systems is that solar panels generate voltages whenever the sun shines on them. Panels are frequently connected in series, and the combined voltage can reach several hundred volts. This can be problematic when it is desired to, for example, fight fires without the danger of electrocution. For this reason it is necessary to remove hazardous voltage from the solar array.

Typical fire safety shutdown systems use semiconductor devices as the active switching element to perform the function described above. It is safer to design a system that will remain engaged even if fire damage severs any connection to control electronics.

SUMMARY

In accordance with the presently claimed invention, a system and method are provided for restricting output power from multiple serially coupled DC power sources, such as a solar cell array, controlled by power balancing circuitry, thereby enabling power restriction in the event of an emergency. Output bypass circuitry allows the output voltage to be selectively restricted, and though power for switching between states would be needed, use of bi-stable bypass circuitry would avoid a need for power to remain in a bypass state operation. Additionally, with the serially coupled DC power sources controlled by power balancing circuitry, use of solid-state current switching elements ensures continued output power restriction due to the clamping action of the current switching element body diodes upon the output voltage.

In accordance with one embodiment of the presently claimed invention, circuitry for restricting output power from a DC power source includes: a plurality of electrodes, including power and ground electrodes and one or more intermediate electrodes between the power and ground electrodes, for conveying voltage and current from a plurality of serially coupled DC power sources via the power and ground electrodes; current switching circuitry coupled between the power and ground electrodes and to the one or more intermediate electrodes; and output switching circuitry coupled between the power and ground electrodes and responsive to at least one power control signal by switching between high and low impedance states providing high and low impedance current paths, respectively, between the power and ground electrodes.

In accordance with another embodiment of the presently claimed invention, a method for restricting output power from a DC power source includes: conveying voltage and current via power and ground electrodes from a plurality of DC power sources serially coupled via one or more intermediate electrodes between the power and ground electrodes; routing a plurality of currents via current switching circuitry coupled between the power and ground electrodes and to the one or more intermediate electrodes; and responding to at least one power control signal by switching between high and low impedance states between the power and ground electrodes.

BRIEF DESCRIPTION OF THE DRAWINGS

FIG. 2(a) depicts control circuitry for the latching relay in accordance with exemplary embodiments of the presently claimed invention.

FIG. 2(b) is a logic flow chart for a shutdown procedure in accordance with exemplary embodiments of the presently claimed invention.

DETAILED DESCRIPTION

As discussed in more detail below, solar panel shutdown in accordance with exemplary embodiments of the presently claimed invention enable: use of a mechanical memory latching relay to remove hazardous voltages from a solar array even when access to control signals is severed; semiconductor circuitry to reduce stress on the mechanical contacts of a latching relay, thereby allowing a smaller relay to be used while also increasing reliability; use of MOSFET transistor drain-source diodes to maintain safe voltages on all panels independent of the integrity of individual solar panel wires; and active confirmation of shutdown through relay sensing circuitry.

There are at least two ways to safely remove hazardous voltages from an array: break the string by disconnecting panels, or short the outputs of the panels to ground (e.g., via switches).

Instead of using a semiconductor transistor to provide the switching function, an electromechanical latching relay is used. This relay has 'mechanical memory', and is also known as 'bi-stable'. Such relays switch from one state to another state, and are equally stable in either, requiring no further electrical power to maintain the state. This is an inherently safer approach.

Figure 1:
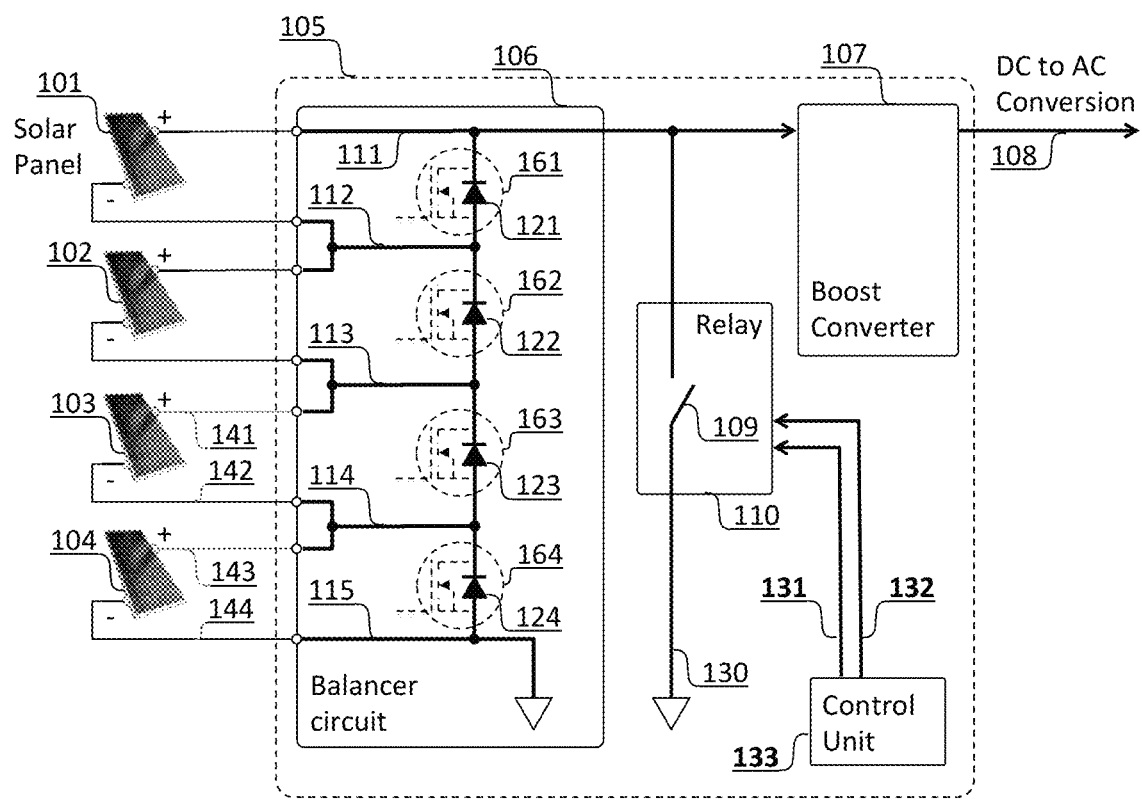
FIG. 1 depicts an implementation architecture in accordance with exemplary embodiments of the presently claimed invention.

A block diagram of part of the preferred implementation is shown in FIG. 1. Four solar panels (101, 102, 103, 104) are connected to a Balancer circuit (106) in the block diagram. (An example of such a Balancer circuit is described in U.S. Patent Publication 2010/0308660, the contents of which are incorporated herein by reference.) The Balancer circuit (106) connects to the Boost converter (107). The relay (110) shorts the Balancer output to common when activated. The Balancer circuit (106) connects the panels (101) into a serial string of, for example, four. One end of the string is connected to common, and the other end can achieve over a hundred Volts and several Amperes when in bright sunlight. Relays that can switch such high voltages and currents simultaneously are physically large. Smaller, lower cost relays can usually either cope with high voltage or high current reliably when switching but not both at the same time.

The circuitry in the Balancer (106) can short each panel to ground when commanded to do so. (For example, in the case of the Balancer of U.S. Patent Publication 2010/0308660, the panels can be shorted to ground by turning on all Balancer transistors, e.g., SW1-SW6 in FIG. 5, and SW1-SW8 in FIG. 5A.) This is achieved using transistors that short each panel to ground for long enough to allow the latching relay to switch under low voltage conditions. This significantly extends the life of the relay and also allows a smaller unit to be used.

The control unit (133) shown in FIG. 1 that controls the latching relay (110) is detailed in FIG. 2. The latching relay pin (405 in FIG. 4) that senses when the relay switches is connected (205 in FIG. 2) to the micro-processor (242) Input$_1$ via a pull-up resistor (260). The micro-processor has two outputs (Out$_1$ & Out$_2$) that connect to relay drivers (252, 253). The relay driver outputs ((231, 232) corresponding to (131, 132) in FIG. 1, (431, 432) in FIG. 4) connect to the latching relay (110 in FIG. 1) (410 in FIG. 4). The micro-processor (242) can communicate with other system components using the bi-directional digital communications (291, 292).

Logical flow of the control unit (233) is shown in FIG. 2(*b*).

Figure 3:
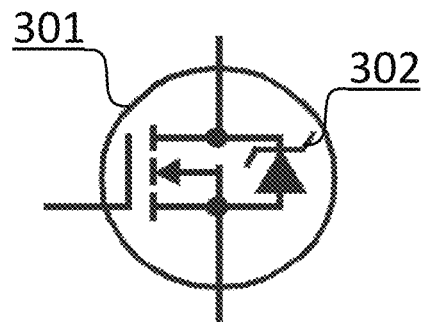
FIG. 3 depicts a metal oxide semiconductor field effect transistor (MOSFET) with a drain-source diode.

The MOSFET transistors (161, 162, 163, 164 and 301) used in the Balancer circuit (106) have a Drain-Source diode, or 'body diode' (302) as shown in FIG. 3, and these same body diodes are shown in FIG. 1 (121, 122, 123, 124). These body diodes effectively act as bypass diodes for each solar panel. When activated, the latching relay (110) connects the high voltage end (111) of the string of panels to ground (130). During shutdown it is possible for one or more panel wires to become severed, by a firefighter's axe, for example. If such a break were to occur to a string of panels without this novel arrangement of bypass diodes, the shorting to ground would no longer be in effect. With this preferred implementation all of the remaining panels will continue to be clamped to within a few Volts of ground by the diode chain. For example, if one wire (142) from panel (103) were severed, the voltage developed by panel (104) would be clamped through diodes (123, 122, 121) to ground (130) through the relay (110).

Figure 4:
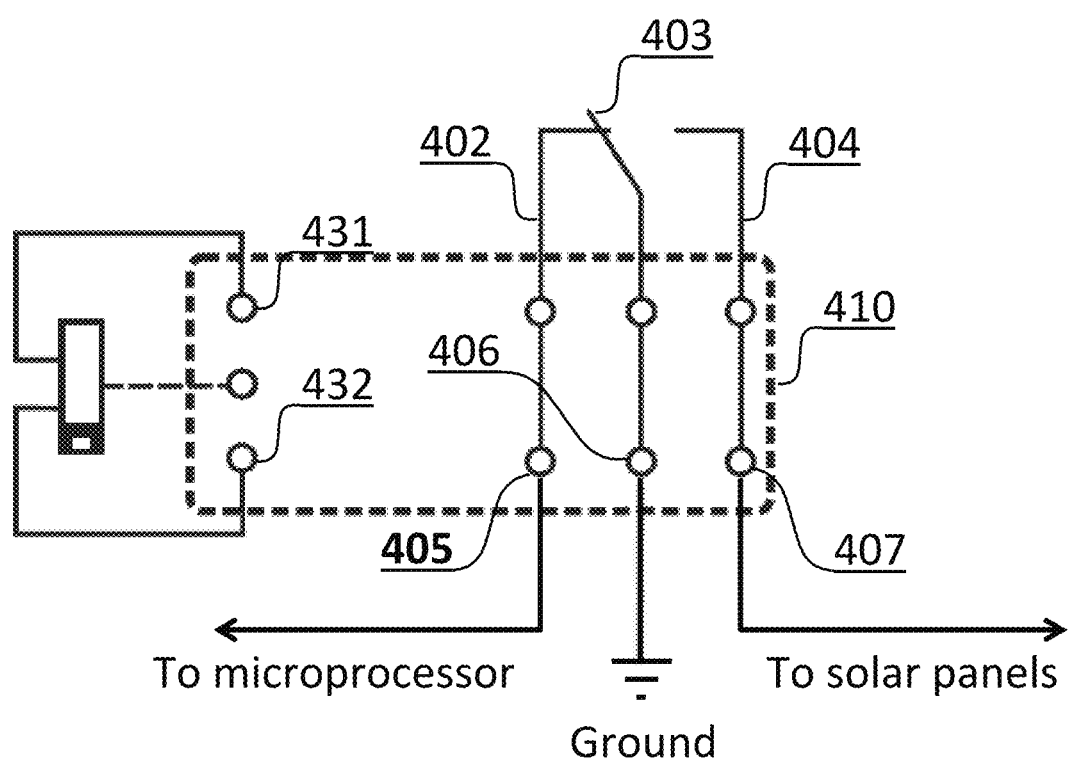
FIG. 4 depicts shutdown confirmation using a single-pole double-throw relay in accordance with exemplary embodiments of the presently claimed invention.

Upon initiating safety shutdown, all systems send a command to cause removal of hazardous voltages from connected panels. However, in many alternative implementations a firefighter will only know that the command was sent, not that shutdown has been successfully accomplished. In the implementation described here, a single-pole double-throw latching relay is used, connected as shown in FIG. 4.

With this preferred implementation the system is monitoring one pin (405) of the relay. When not in a shutdown state, the port will sense the presence of ground (as shown, (402) connected to (403)). However, when the relay is instructed to switch, a successful change of state of the relay will cause the panels (407) to be shorted to ground ((404) connected to (403) through to (406)), and the microprocessor to sense pin (405) as an open circuit, confirming successful state change. Physical switching of the relay accomplishes shutdown and simultaneous confirmation. This has the advantage that the system can report back to a user that shutdown has been successfully achieved and that the solar system presents no further risk.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including circuitry for restricting output power from a DC power source, said apparatus comprising:
   a plurality of electrodes, including power and ground electrodes and one or more intermediate electrodes between said power and ground electrodes, for conveying voltage and current from a plurality of serially coupled DC power sources via said power and ground electrodes;
   current switching circuitry coupled between said power and ground electrodes and to said one or more intermediate electrodes;
   output switching circuitry coupled between said power and ground electrodes and responsive to at least one power control signal by switching between high and low impedance states providing high and low impedance current paths, respectively, between said power and ground electrodes, wherein said output switching circuitry remains in one of said high impedance state and said low impedance state, after being switched responsive to said at least one power control signal, without further electrical power; and
   a microprocessor, wherein said microprocessor controls a shutdown operation of said apparatus including:
      receiving a shutdown command;
      sending a control signal to said output switching circuitry to switch to said low impedance state;
      sensing a voltage of said output switching circuitry; and
      when said voltage having been sensed does not indicate that said output switching circuitry has been switched to said low impedance state, resending said control signal to said output switching circuitry to switch to said low impedance state.

2. The apparatus of claim 1, wherein said current switching circuitry comprises a plurality of serially coupled switch circuits, wherein each one of said plurality of serially coupled switch circuits is coupled between oppositely polarized electrodes of respective portions of said plurality of serially coupled DC power sources.

3. The apparatus of claim 2, wherein said plurality of serially coupled switch circuits comprises a plurality of serially coupled solid-state switch circuits.

4. The apparatus of claim 2, wherein said plurality of serially coupled switch circuits comprises a plurality of serially coupled field effect transistors.

5. The apparatus of claim 4, wherein each one of said plurality of field effect transistors includes a respective body diode coupled between said oppositely polarized electrodes.

6. The apparatus of claim 1, wherein said output switching circuitry comprises an electromechanical relay.

7. The apparatus of claim 1, wherein said output switching circuitry comprises a latching relay.

8. The apparatus of claim 1, wherein said output switching circuitry comprises a single-pole double-throw relay.

9. The apparatus of claim 1, wherein said output switching circuitry comprises bi-stable switching circuitry.

10. The apparatus of claim 1, wherein said microprocessor controls said shutdown operation of said apparatus further including:
  when said voltage having been sensed indicates that said output switching circuitry has been switched to said low impedance state, sending an acknowledgement that said output switching circuitry has been switched to said low impedance state.

11. The apparatus of claim 1, wherein said microprocessor controls a clear operation of said apparatus including:
  receiving a clear command;
  sending a second control signal to said output switching circuitry to switch to said high impedance state;
  sensing a voltage of said output switching circuitry;
  when said voltage having been sensed does not indicate that said output switching circuitry has been switched to said high impedance state, resending said control signal to said output switching circuitry to switch to said high impedance state; and
  when said voltage having been sensed indicates that said output switching circuitry has been switched to said high impedance state, sending an acknowledgement that said output switching circuitry has been switched to said high impedance state.

12. A method for restricting output power from a DC power source, said method comprising:
  conveying voltage and current via power and ground electrodes from a plurality of DC power sources serially coupled via one or more intermediate electrodes between said power and ground electrodes;
  routing a plurality of currents via current switching circuitry coupled between said power and ground electrodes and to said one or more intermediate electrodes; and
  responding to at least one power control signal by switching output switching circuitry between high and low impedance states between said power and ground electrodes, wherein said output switching circuitry remains in one of said high impedance state and said low impedance state, after being switched responsive to said at least one power control signal, without further electrical power, including controlling a shutdown operation comprising:
  receiving a shutdown command;
  sending a control signal to said output switching circuitry to switch to said low impedance state;
  sensing a voltage of said output switching circuitry; and
  when said voltage having been sensed does not indicate that said output switching circuitry has been switched to said low impedance state, resending said control signal to said output switching circuitry to switch to said low impedance state.

13. The method of claim 12, wherein said routing a plurality of currents via current switching circuitry comprises routing said plurality of currents via a plurality of serially coupled switch circuits, wherein each one of said plurality of serially coupled switch circuits is coupled between oppositely polarized electrodes of respective portions of said plurality of serially coupled DC power sources.

14. The method of claim 13, wherein said routing said plurality of currents via a plurality of serially coupled switch circuits comprises routing said plurality of currents via a plurality of serially coupled solid-state switch circuits.

15. The method of claim 13, wherein routing said plurality of currents via a plurality of serially coupled switch circuits comprises routing said plurality of currents via a plurality of serially coupled field effect transistors.

16. The method of claim 15, wherein each one of said plurality of serially coupled field effect transistors includes a respective body diode coupled between said oppositely polarized electrodes.

17. The method of claim 12, wherein said responding to at least one power control signal by switching between high and low impedance states between said power and ground electrodes comprises switching an electromechanical relay.

18. The method of claim 12, wherein said responding to at least one power control signal by switching between high and low impedance states between said power and ground electrodes comprises switching a latching relay.

19. The method of claim 12, wherein said responding to at least one power control signal by switching between high and low impedance states between said power and ground electrodes comprises switching a single-pole double-throw relay.

20. The method of claim 12, wherein said responding to at least one power control signal by switching between high and low impedance states comprises providing bi-stable high and low impedance current paths, respectively.

* * * * *